(12) United States Patent
Sun et al.

(10) Patent No.: US 12,271,518 B2
(45) Date of Patent: Apr. 8, 2025

(54) GAZE POINT CALCULATION APPARATUS AND DRIVING METHOD THEREFOR, AND ELECTRONIC DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Gaoming Sun, Beijing (CN); Guofeng Hu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 403 days.

(21) Appl. No.: 17/787,012

(22) PCT Filed: May 11, 2021

(86) PCT No.: PCT/CN2021/093117
§ 371 (c)(1),
(2) Date: Jun. 17, 2022

(87) PCT Pub. No.: WO2022/062422
PCT Pub. Date: Mar. 31, 2022

(65) Prior Publication Data
US 2023/0015967 A1    Jan. 19, 2023

(30) Foreign Application Priority Data

Sep. 28, 2020   (CN) .......................... 202011045736.2

(51) Int. Cl.
*G06F 3/01*    (2006.01)
*G06F 7/523*   (2006.01)
(Continued)

(52) U.S. Cl.
CPC .............. *G06F 3/013* (2013.01); *G06F 7/523* (2013.01); *G06T 1/60* (2013.01); *G06T 7/73* (2017.01);
(Continued)

(58) Field of Classification Search
CPC . G06F 3/013; G06F 7/523; G06F 9/30; G06T 1/60; G06T 1/20; G06T 12/0811; G06T 7/73; G06V 10/955; G06V 40/193
See application file for complete search history.

(56) References Cited

U.S. PATENT DOCUMENTS

2010/0103375 A1    4/2010   Chao
2021/0088784 A1*   3/2021   Whitmire ........... G02B 27/0101
(Continued)

FOREIGN PATENT DOCUMENTS

CN    106066696 A    11/2016
CN    108196881 A    6/2018
(Continued)

*Primary Examiner* — Bobbak Safaipour
*Assistant Examiner* — Michael Kim Maiden
(74) *Attorney, Agent, or Firm* — XSENSUS LLP (57) ABSTRACT

A gaze point calculation apparatus includes: a first cache register, a multiplexer, an arithmetic unit assembly, and a state machine. The first cache register is configured to receive and store first coordinates and a plurality of calibration parameters required when second required are obtained through calculation according to the first coordinates. The state machine is configured to control the multiplexer to select each time at least one value from the first cache register and transmit same to the arithmetic unit assembly. The arithmetic unit assembly is configured to perform a preset operation on the at least one value received each time until the second coordinates are obtained, and output the second coordinates under control of the state machine.

20 Claims, 7 Drawing Sheets

(51) Int. Cl.
*G06T 1/60* (2006.01)
*G06T 7/73* (2017.01)
*G06V 10/94* (2022.01)
*G06V 40/18* (2022.01)

(52) U.S. Cl.
CPC .......... *G06V 10/955* (2022.01); *G06V 40/193* (2022.01)

(56) References Cited

U.S. PATENT DOCUMENTS

2021/0341998 A1 11/2021 Sun
2021/0350550 A1* 11/2021 Stengel .................. G06V 40/19

FOREIGN PATENT DOCUMENTS

| CN | 110032271 A | 7/2019 |
| CN | 110619303 A | 12/2019 |
| CN | 212433723 U | 1/2021 |

\* cited by examiner

GAZE POINT CALCULATION APPARATUS AND DRIVING METHOD THEREFOR, AND ELECTRONIC DEVICE

CROSS-REFERENCE TO RELATED APPLICATIONS

This application is a national phase entry under 35 USC 371 of International Patent Application No. PCT/CN2021/093117, filed on May 11, 2021, which claims priority to Chinese Patent Application No. 202011045736.2, filed on Sep. 28, 2020, which are incorporated herein by reference in their entirety.

TECHNICAL FIELD

The present disclosure relates to the field of chip technologies, and in particular, to a gaze point calculation apparatus and a driving method therefor, and an electronic device.

BACKGROUND

Existing electronic devices, such as augmented reality (AR) display devices and virtual reality (VR) display devices, need to rely on central processing units (CPUs) of computers to realize gaze point recognition based on eye tracking, which may cause problems of huge related devices, inconvenience for carrying and being not conducive to human-computer interaction.

SUMMARY

In an aspect, a gaze point calculation apparatus is provided. The gaze point calculation apparatus includes a first cache register, a multiplexer, an arithmetic unit assembly and a state machine. The multiplexer is coupled to the first cache register. The arithmetic unit assembly is coupled to the multiplexer. The state machine is coupled to the multiplexer and the arithmetic unit assembly. The first cache register is configured to receive and store first coordinates and a plurality of calibration parameters required when second coordinates are obtained through calculation according to the first coordinates. The first coordinates are position coordinates of a pupil, and the second coordinates are position coordinates of a gaze point. The state machine is configured to control the multiplexer to select each time at least one value from the first cache register and transmit the at least one value to the arithmetic unit assembly. The at least one value is selected from the first coordinates and the plurality of calibration parameters. The arithmetic unit assembly is configured to perform a preset operation on the at least one value received each time until the second coordinates are obtained, and output the second coordinates under control of the state machine.

In some embodiments, the arithmetic unit assembly obtains the second coordinates through calculation according to following formulas:

$$X_G = a_0 + a_1 x_1 + a_2 y_1 + a_3 x_1 y_1 + a_4 x_1^2 + a_5 y_1^2;$$

$$Y_G = b_0 + b_1 x_1 + b_2 y_1 + b_3 x_1 y_1 + b_4 x_1^2 + b_5 y_1^2.$$

Where $(x_1, y_1)$ is the first coordinates; $a_0$ to $a_5$ and $b_0$ to $b_5$ are the calibration parameters, and $a_0$ to $a_5$ and $b_0$ to $b_5$ are vectors; and $(X_G, Y_G)$ is the second coordinates.

In some embodiments, the arithmetic unit assembly includes a multiplier and an accumulator. The multiplier is coupled to the multiplexer, and the multiplier is configured to calculate $x_1^2$, $a_1 x_1$, $a_4(x_1^2)$, $x_1 y_1$, $y_1^2$, $a_2 y_1$, $a_3(x_1 y_1)$, $a_5(y_1^2)$, $b_1 x_1$, $b_2 y_1$, $b_3(x_1 y_1)$, $b_4(x_1^2)$ and $b_5(y_1^2)$. The accumulator is coupled to the multiplier, the multiplexer and the state machine. The accumulator is configured to calculate $a_0 + a_p x_1 + a_2 y_1 + a_3 xy_1 + a_4 x_1^2 + a_5 y_1^2$ to output $X_G$, and calculate $b_0 + b_1 x_1 + b_2 y_1 + b_3 x_1 y_1 + b_4 x_1^2 + b_5 y_1^2$ to output $Y_G$.

In some embodiments, the arithmetic unit assembly includes a first multiplier, a first accumulator, a second multiplier, and a second accumulator. The first multiplier is coupled to the multiplexer, and the first multiplier is configured to calculate $a_1 x_1$, $a_4(x_1^2)$, $a_2 y_1$, $a_3(x_1 y_1)$, and $a_5(y_1^2)$. The first accumulator is coupled to the first multiplier, the multiplexer and the state machine. The first accumulator is configured to calculate $a_0 + a_1 x_1 + a_2 y_1 + a_3 xy_1 + a_4 x_1^2 + a_5 y_1^2$ to output $X_G$. The second multiplier is coupled to the multiplexer, and the second multiplier is configured to calculate $b_1 x_1$, $b_4(x_1^2)$, $b_2 y_1$, $b_3(x_1 y_1)$, and $b_5(y_1^2)$. The second accumulator is coupled to the second multiplier, the multiplexer and the state machine. The second accumulator is configured to calculate $b_0 + b_1 x_1 + b_2 y_1 + b_3 x_1 y_1 + b_4 x_1^2 + b_5 y_1^2$ to output $Y_G$. At least one of the first multiplier and the second multiplier is further configured to calculate $x_1^2$, $x_1 y_1$ and $y_1^2$. Or, the first multiplier is further configured to calculate a part of $x_1^2$, $x_1 y_1$ and $y_1^2$, and the second multiplier is further configured to calculate a remaining part of $x_1^2$, $x_1 y_1$ and $y_1^2$.

In some embodiments, the arithmetic unit assembly is further configured to: convert the received at least one value from an original code into a complement code; calculate the at least one value converted into the complement code to obtain an intermediate calculation result; and convert the intermediate calculation result from another complement code into another original code to obtain an operation result.

In some embodiments, the arithmetic unit assembly is further coupled to the first cache register, and the arithmetic unit assembly is further configured to transmit, under the control of the state machine, at least a part of intermediate values that need to be stored in intermediate values generated by the arithmetic unit assembly to the first cache register for storage. Or, the arithmetic unit assembly further includes at least one second cache register, and the arithmetic unit assembly is further configured to transmit, under the control of the state machine, at least a part of intermediate values that need to be stored in the intermediate values generated by the arithmetic unit assembly to the at least one second cache register for storage.

In some embodiments, the arithmetic unit assembly is further coupled to the first cache register, and the arithmetic unit assembly is further configured to transmit, under the control of the state machine, some of at least a part of intermediate values that need to be stored in intermediate values generated by the arithmetic unit assembly to the first cache register for storage; and the arithmetic unit assembly further includes at least one second cache register, and the arithmetic unit assembly is further configured to transmit, under the control of the state machine, another of the part of intermediate values that need to be stored in the intermediate values generated by the arithmetic unit assembly to the at least one second cache register for storage.

In some embodiments, the gaze point calculation apparatus further includes a normalization processing module coupled to the first cache register. The normalization processing module is configured to: receive initial coordinates of the pupil in an acquired image of a human eye; and perform normalization processing on the initial coordinates to obtain the first coordinates, and transmit the first coordinates after the normalization processing to the first cache register.

In some embodiments, the normalization processing module performs the normalization processing on the initial coordinates according to following formulas:

$x_1 = x'/$ lateral resolution of the acquired image of the human eye;

$y_1 = y'/$ vertical resolution of the acquired image of the human eye.

Where (x', y') is the initial coordinates, and $(x_1, y_1)$ is the first coordinates.

In some embodiments, the gaze point calculation apparatus is a field programmable gate array (FPGA) chip or an application specific integrated circuit (ASIC) chip.

In another aspect, an electronic device is provided. The electronic device includes the gaze point calculation apparatus according to any of the above embodiments.

In some embodiments, the electronic device includes a pupil coordinate extraction module and a display driver module that are coupled to the gaze point calculation apparatus. The pupil coordinate extraction module is configured to acquire an image of a human eye, and determine initial coordinates of the pupil in the image of the human eye according to the image of the human eye, the initial coordinates or initial coordinates after normalization processing being the first coordinates, and the first coordinates being the position coordinates of the pupil. The gaze point calculation apparatus is configured to obtain the second coordinates through calculation according to the first coordinates, the second coordinates being the position coordinates of the gaze point. The display driver module is configured to process a displayed image according to the second coordinates.

In some embodiments, the pupil coordinate extraction module includes a camera and a processing module. The camera is configured to acquire the image of the human eye. The processing module is configured to determine, according to the acquired image of the human eye, the initial coordinates of the pupil in the image of the human eye based on an image processing algorithm.

In some embodiments, the electronic device includes an augmented reality (AR) display device or a virtual reality (VR) display device.

In yet another aspect, a driving method for a gaze point calculation apparatus is provided. The gaze point calculation apparatus includes a first cache register, a multiplexer coupled to the first cache register, an arithmetic unit assembly coupled to the multiplexer, and a state machine coupled to the multiplexer and the arithmetic unit assembly. The driving method includes: controlling, by the state machine, the multiplexer to select each time at least one value from the first cache register and transmit the at least one value to the arithmetic unit assembly, the at least one value being selected from first coordinates and a plurality of calibration parameters required when second coordinates are obtained through calculation according to the first coordinates, both the first coordinates and the plurality of calibration parameters being stored in the first cache register; performing, by the arithmetic unit assembly, a preset operation on the at least one value received each time until the second coordinates are obtained; and outputting, by the arithmetic unit assembly, the second coordinates under control of the state machine.

In some embodiments, the second coordinates are obtained according to following formulas:

$X_G = a_0 + a_1 x_1 + a_2 y_1 + a_3 x_1 y_1 + a_4 x_1^2 + a_5 y_1^2;$ $Y_G = b_0 + b_1 x_1 + b_2 y_1 + b_3 x_1 y_1 + b_4 x_1^2 + b_5 y_1^2.$

Where $(x_1, y_1)$ is the first coordinates; $a_0$ to $a_5$ and $b_0$ to $b_5$ are the calibration parameters, and $a_0$ to $a_5$ and $b_0$ to $b_5$ are vectors; and $(X_G, Y_G)$ is the second coordinates.

In some embodiments, the driving method further includes: converting the received at least one value from an original code into a complement code; calculating the at least one value converted into the complement code to obtain an intermediate calculation result; and converting the intermediate calculation result from another complement code into another original code to obtain an operation result.

In some embodiments, the driving method further includes: receiving initial coordinates of the pupil in an acquired image of a human eye; performing normalization processing on the initial coordinates to obtain the first coordinates, and transmitting the first coordinates after the normalization processing to the first cache register.

In some embodiments, the normalization processing is performed according to following formulas:

$x_1 = x'/$ lateral resolution of the acquired image of the human eye;

$y_1 = y'/$ vertical resolution of the acquired image of the human eye.

Where (x', y') is the initial coordinates, and $(x_1, y_1)$ is the first coordinates.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual sizes of products, actual processes of methods and actual timings of signals to which the embodiments of the present disclosure relate.

DETAILED DESCRIPTION

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive sense, i.e., "including, but not limited to". In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representation of the above term does not necessarily refer to the same embodiment(s) or example(s). In addition, the specific features, structures, materials or characteristics may be included in any one or more embodiments or examples in any suitable manner.

Hereinafter, the terms "first" and "second" are only used for descriptive purposes, and are not to be construed as indicating or implying the relative importance or implicitly indicating the number of indicated technical features. Thus, features defined as "first" or "second" may explicitly or implicitly include one or more of the features. In the description of the embodiments of the present disclosure, the term "a plurality of" or "the plurality of" means two or more unless otherwise specified.

In the description of some embodiments, the expressions "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if", depending on the context, is optionally construed as "when", "in a case where", "in response to determining" or "in response to detecting". Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The use of the phrase "applicable to" or "configured to" herein means an open and inclusive language, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

Figure 1A:
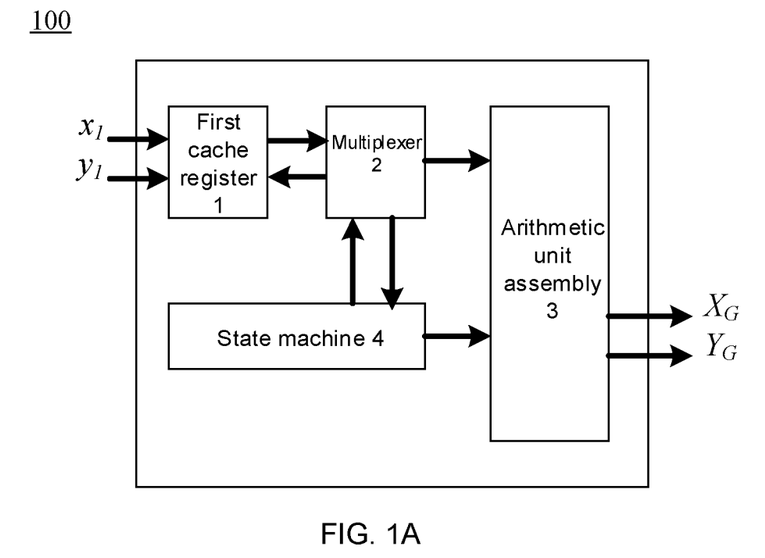
FIG. 1A is a block diagram showing a structure of a gaze point calculation apparatus, in accordance with some embodiments.

Some embodiments of the present disclosure provide a gaze point calculation apparatus 100. As shown in FIG. 1A, the gaze point calculation apparatus 100 includes a first cache register 1, a multiplexer 2, an arithmetic unit assembly 3 and a state machine 4. The multiplexer 2 is coupled to the first cache register 1, the arithmetic unit assembly 3 is coupled to the multiplexer 2, and the state machine 4 is coupled to the multiplexer 2 and the arithmetic unit assembly 3. The state machine 4 may be a finite-state machine.

It will be noted that, the state machine 4 may determine, according to its own operation state, an overall operation progress of the gaze point calculation apparatus 100, so that it may be known that which values are stored in the first cache register 1, and in the stored values, which values are used, which values are not used, and which values require a second operation.

Figure 1B:
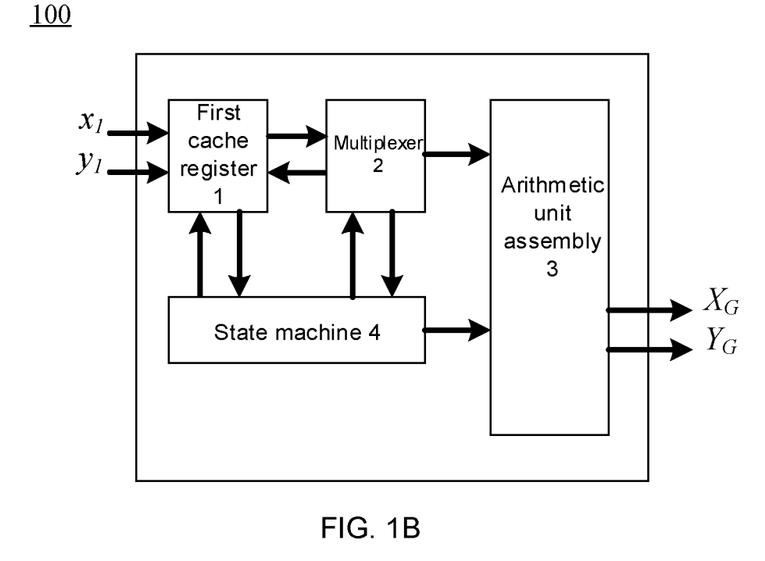
FIG. 1B is a block diagram showing a structure of another gaze point calculation apparatus, in accordance with some embodiments.

In some other examples, referring to FIG. 1B, the state machine 4 may be coupled to the first cache register 1. In this case, the state machine 4 may directly perform information interaction with the first cache register 1, so that it may be quickly known that which values are stored in the first cache register 1, and in the stored values, which values are used, which values are not used, and which values require a second operation.

The first cache register 1 is configured to receive and store first coordinates and a plurality of calibration parameters required when second coordinates are obtained through calculation according to the first coordinates. The first coordinates are position coordinates of a pupil, and the second coordinates are position coordinates of a gaze point. When the position coordinates of the pupil are determined, the pupil may be simplified into a point for positioning. For example, the point may be a center point of the pupil, which is not limited in the embodiments of the present disclosure. In some other examples, the point may be a point at a position other than the center point of the pupil, such as a point on a border of the pupil.

The state machine 4 is configured to control the multiplexer 2 to select each time at least one value from the first cache register 1 and transmit the at least one value to the arithmetic unit assembly 3.

The arithmetic unit assembly 3 is configured to perform a preset operation (e.g., a multiplication operation, a root operation, or an addition operation) on the at least one value received each time until the second coordinates are obtained, and output the second coordinates under control of the state machine 4. For example, in a case where the second coordinates are $(X_G, Y_G)$, under the control of the state machine 4, one of $X_G$ and $Y_G$ may be obtained through calculation and output first, and then the other one is obtained through calculation and output; alternatively, $X_G$ and $Y_G$ are sequentially obtained through calculation, and are then output at a same time.

It will be noted that, one or more intermediate values may be generated in a whole process of obtaining the second coordinates through calculation. When performing the preset operation, the arithmetic unit assembly 3 may perform a second operation on these intermediate values, so as to finally obtain the second coordinates. Processing of some intermediate values will be described below with reference to some examples.

Figure 1C:
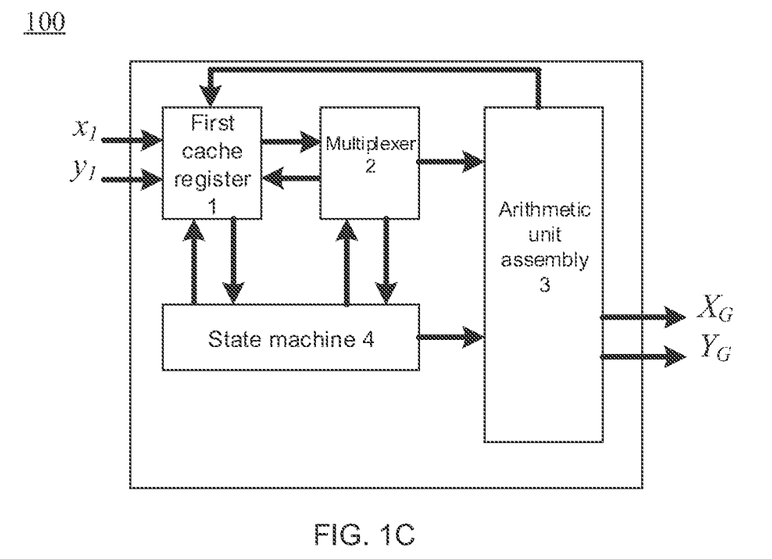
FIG. 1C is a block diagram showing a structure of yet another gaze point calculation apparatus, in accordance with some embodiments.

In some examples, as shown in FIG. 1C, the arithmetic unit assembly 3 is further coupled to the first cache register 1. In this case, the arithmetic unit assembly 3 is further configured to transmit, under the control of the state machine 4, at least a part of intermediate values that need to be stored in intermediate values generated by the arithmetic unit assembly 3 to the first cache register 1 for storage. It can be understood that, in a case where the first cache register 1 has stored the intermediate values therein, when the multiplexer 2 subsequently selects the at least one value from the first cache register 1, the at least one value may include at least one of the intermediate values, the calibration parameters or the first coordinates.

Figure 1D:
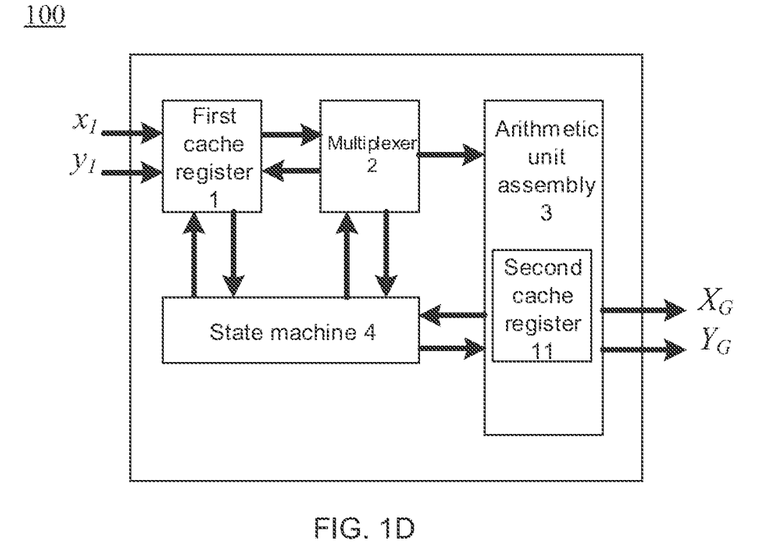
FIG. 1D is a block diagram showing a structure of yet another gaze point calculation apparatus, in accordance with some embodiments.

In some other examples, as shown in FIG. 1D, the arithmetic unit assembly 3 further includes at least one second cache register 11. In this case, the arithmetic unit assembly 3 is further configured to transmit, under the control of the state machine 4, at least a part of intermediate values that need to be stored in the intermediate values generated by the arithmetic unit assembly 3 to the at least one second cache register 11 for storage. It can be understood that, intermediate values stored in different second cache registers 11 may be different.

The arithmetic unit assembly 3 may include one group of arithmetic units or at least two groups of arithmetic units connected in parallel, and each group of arithmetic units may include at least two arithmetic units connected in series. A second cache register 11 may be integrated in an arithmetic unit.

Figure 1E:
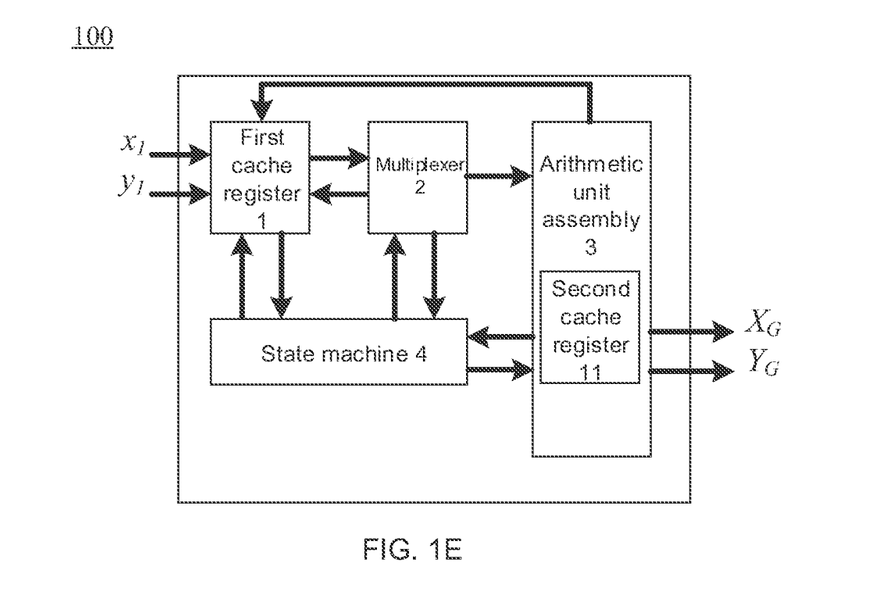
FIG. 1E is a block diagram showing a structure of yet another gaze point calculation apparatus, in accordance with some embodiments.

In yet some other examples, as shown in FIG. 1E, the arithmetic unit assembly 3 is couple to the first cache register 1, and the arithmetic unit assembly 3 further includes at least one second cache register 11. In this case, the intermediate values that need to be stored generated by the arithmetic unit assembly 3 may be divided into a plurality of parts, and are stored in different cache registers (i.e., the first cache register 1 and the at least one second cache register 11).

The gaze point calculation apparatus 100 includes a plurality of hardware (e.g., the first cache register 1, the multiplexer 2, the arithmetic unit assembly 3 and the state machine 4). That is, through a hardware-based implementation solution, the gaze point calculation apparatus 100 achieves processing of the first coordinates (i.e., the position coordinates of the pupil) to output the second coordinates (i.e., the position coordinates of the gaze point).

In some examples, the gaze point calculation apparatus 100 may be a field programmable gate array (FPGA) chip. In some other examples, the gaze point calculation apparatus 100 may be an application specific integrated circuit (ASIC) chip.

It is worth pointing out that, in terms of eye tracking, calculation of the gaze point achieved through a central processing unit (CPU) of a computer may result in problems of huge related devices, inconvenience for carrying, and being not conducive to human-computer interaction. However, the gaze point calculation apparatus 100 provided by the embodiments of the present disclosure may be well integrated into an all-in-one device (e.g., an augmented reality (AR) display device or a virtual reality (VR) display device) to achieve the calculation of the gaze point. As a result, it is possible to solve the technical problems of huge related devices, inconvenience for carrying, and being not conducive to the human-computer interaction. In addition, using the gaze point calculation apparatus 100 also has advantages of fast operation speed and low overall power consumption.

A process of achieving the calculation of the gaze point by using the gaze point calculation apparatus 100 will be described below through some embodiments.

In some embodiments, referring to FIGS. 1A to 1E and 2, the gaze point calculation apparatus 100 may obtain the second coordinates through calculation according to the following formulas:

$$X_G = a_0 + a_1 x_1 + a_2 y_1 + a_3 x_1 y_1 + a_4 x_1^2 + a_5 y_1^2;$$

$$Y_G = b_0 + b_1 x_1 + b_2 y_1 + b_3 x_1 y_1 + b_4 x_1^2 + b_5 y_1^2.$$

Where $(x_1, y_1)$ is the first coordinates (i.e., the position coordinates of the pupil); $a_0$ to $a_5$ and $b_0$ to $b_5$ are the calibration parameters, and $a_0$ to $a_5$ and $b_0$ to $b_5$ are vectors; and $(X_G, Y_G)$ is the second coordinates (i.e., the position coordinates of the gaze point, e.g., the coordinates of the gaze point in the display area B shown in FIG. 2). Therefore, the gaze point calculation apparatus 100 may process the first coordinates $(x_1, y_1)$ according to the above formulas, and then output the second coordinates $(X_G, Y_G)$. That is, the gaze point calculation apparatus 100 may obtain the position coordinates of the gaze point through calculation according to the position coordinates of the pupil.

Figure 2:
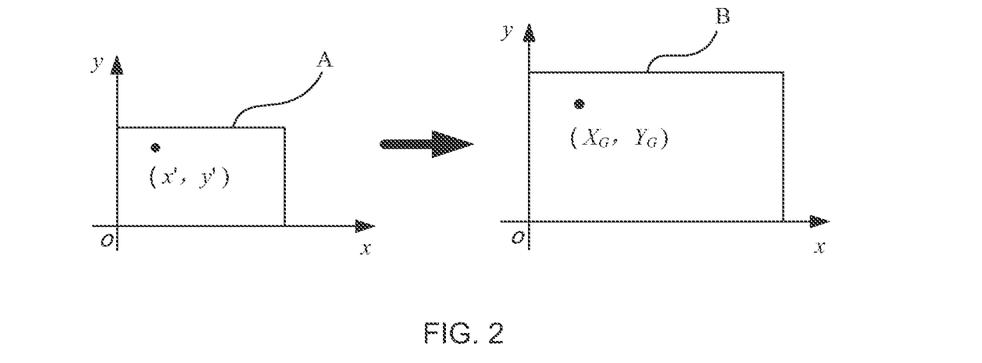
FIG. 2 is a diagram showing a positional relationship between a pupil and a gaze point, in accordance with some embodiments.

It will be noted that, $(x_1, y_1)$ here may be initial coordinates $(x', y')$ of a center of the pupil in an acquired image A of a human eye shown in FIG. 2, or initial coordinates after normalization processing.

Figure 3:
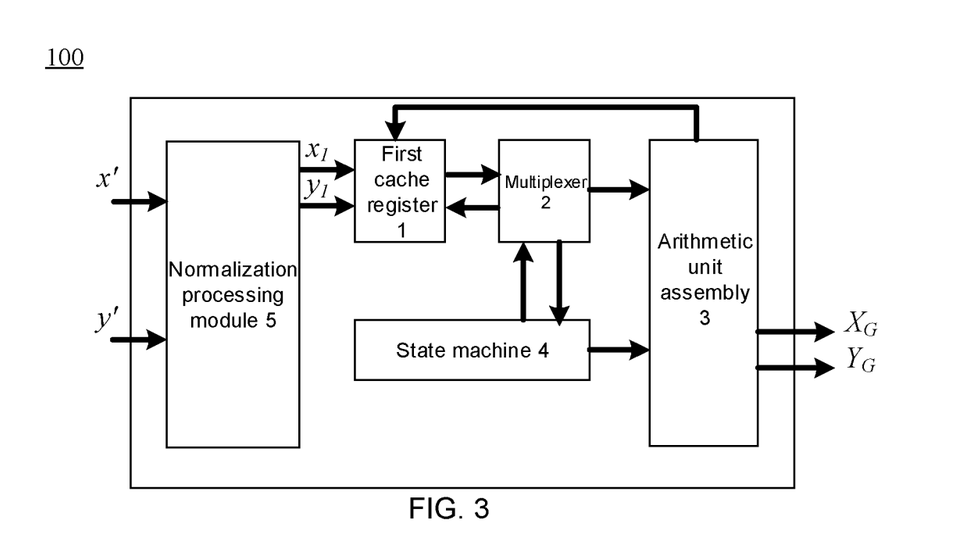
FIG. 3 is a block diagram showing a structure of yet another gaze point calculation apparatus, in accordance with some embodiments.

Based on this, in some examples, as shown in FIG. 3, the gaze point calculation apparatus 100 may further include a normalization processing module 5, which is coupled to the first cache register 1. The normalization processing module 5 is configured to receive the initial coordinates $(x', y')$ of the pupil in the acquired image of the human eye, perform the normalization processing on the initial coordinates $(x', y')$ to obtain the first coordinates $(x_1, y_1)$, and transmit the first coordinates $(x_1, y_1)$ to the first cache register 1.

For example, the normalization processing module 5 may perform the normalization processing on the initial coordinates $(x', y')$ according to the following formulas:

$x_1 = x'/a$ lateral resolution of the acquired image of the human eye;

$y_1 = y'/a$ vertical resolution of the acquired image of the human eye.

Where the lateral resolution of the acquired image of the human eye may be a resolution in an x-axis direction of the acquired image A of the human eye shown in FIG. 2, and the vertical resolution of the acquired image of the human eye may be a resolution in a y-axis direction of the acquired image A of the human eye shown in FIG. 2, and calculation results $x_1$ and $y_1$ are the first coordinates.

Through the above solution, it is possible to facilitate to obtain an accurate second coordinates through calculation, and in turn, the position of the gaze point may be accurately determined.

In some embodiments, the arithmetic unit assembly 3 is configured to: convert the received at least one value from an original code into a complement code; calculate the at least one value converted into the complement code to obtain an intermediate calculation result; and convert the intermediate calculation result from a complement code into an original code to obtain an operation result. With such a configuration, operations of signed (i.e., positive or negative) values may be accurately achieved. For example, in a case where at least one calibration parameter is a negative value, operations such as accumulation, multiplication and root may still be accurately achieved.

The arithmetic unit assembly 3 may be of various structures, which, for example, include but are not limited to the possible implementations described below.

Figure 4:
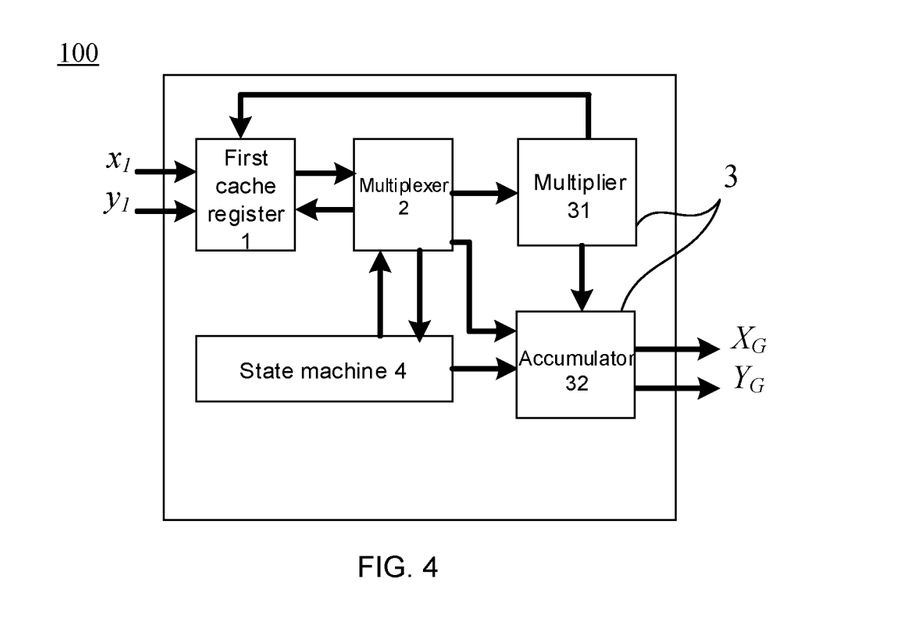
FIG. 4 is a block diagram showing a structure of yet another gaze point calculation apparatus, in accordance with some embodiments.

In a possible implementation, as shown in FIG. 4, the arithmetic unit assembly 3 may include a multiplier 31 and an accumulator 32. For example, the multiplier 31 may be a signed fixed-point multiplier, and the accumulator 32 may be a signed fixed-point accumulator.

During operation, the signed fixed-point multiplier (or the signed fixed-point accumulator) may first convert the received value from the original code into the complement code, and then obtain the intermediate calculation result through calculation, and finally convert the intermediate calculation result from the complement code into the original code to obtain the operation result. In this way, the operations of the signed (i.e., positive or negative) values may be accurately achieved. For example, in the case where at least one calibration parameter is a negative value, the operations such as accumulation, multiplication and root may still be accurately achieved.

In addition, it is worth pointing out that, compared with a hardware circuit structure of a signed floating-point multiplier (or a signed floating-point accumulator), a hardware circuit structure of the signed fixed-point multiplier (or the signed fixed-point accumulator) is simpler and easier to achieve. Therefore, using the signed fixed-point multiplier (or the signed fixed-point accumulator) may facilitate to simplify a circuit structure of the arithmetic unit assembly 3, and further facilitate to simplify a structure of the gaze point calculation apparatus 100.

Figure 5:
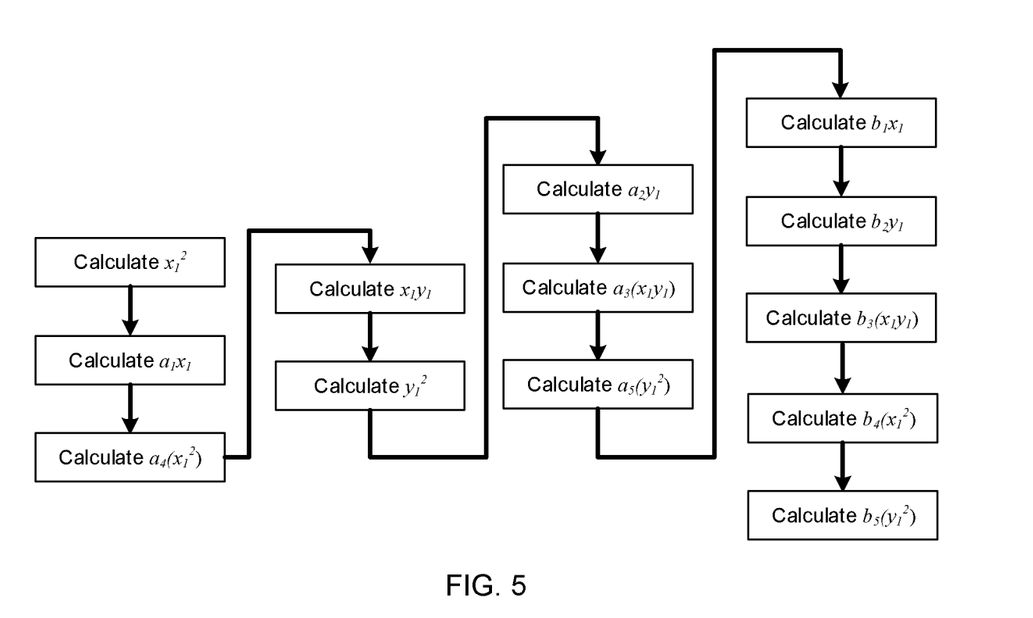
FIG. 5 is a diagram showing an order of operations of a multiplier, in accordance with some embodiments.

The multiplier 31 is coupled to the multiplexer 2, and the multiplier 31 is configured to calculate $x_1^2$, $a_1x_1$, $a_4(x_1^2)$, $x_1y_1$, $y_1^2$, $a_2y_1$, $a_3(x_1y_1)$, $a_5(y_1^2)$, $b_1x_1$, $b_2y_1$, $b_3(x_1y_1)$, $b_4(x_1^2)$ and $b_5(y_1^2)$. For example, for a frame of image of the human eye, the multiplier 31 may sequentially perform thirteen fixed-point multiplication operations according to the sequence shown in FIG. 5 by means of time division multiplexing.

It will be noted that, the intermediate values that need to be stored may include an operation result of $x_1^2$, an operation result of $x_1y_1$, and an operation result of $y_1^2$. These intermediate values may be stored in the first cache register 1 (as shown in FIG. 4), or may be stored in a second cache register integrated in the multiplier 31. In a case where these intermediate values are stored in the first cache register 1, as shown in FIG. 4, the multiplexer 2 may be controlled by the state machine 4 to transmit the intermediate values in the first cache register 1 again to the multiplier 31 for a multiplication operation. In a case where these intermediate values are stored in the second cache register integrated in the multiplier 31, the state machine 4 may directly call the intermediate values in the second cache register for a multiplication operation, without using the multiplexer 2.

The accumulator 32 is coupled to the multiplier 31, the multiplexer 2 and the state machine 4. The accumulator 32 is configured to: calculate $a_0+a_1x_1+a_2y_1+a_3xy_1+a_4x_1^2+a_5y_1^2$, so as to output $X_G$; and calculate $b_0+b_1x_1+b_2y_1+b_3x_1y_1+b_4x_1^2+b_5y_1^2$, so as to output $Y_G$. That is, for a frame of image of the human eye, the accumulator 32 may perform ten accumulation operations by means of time division multiplexing.

It will be noted that, the intermediate values may further include: an operation result of $a_1x_1$, an operation result of $a_2y_1$, an operation result of $a_3(x_1y_1)$, an operation result of $a_4(x_1^2)$, an operation result of $a_5(y_1^2)$, an operation result of $b_1x_1$, an operation result of $b_2y_1$, an operation result of $b_3(x_1y_1)$, an operation result of $b_4(x_1^2)$, and an operation result of $b_5(y_1^2)$. These intermediate values may be stored in the first cache register 1 (as shown in FIG. 4), or may be stored in a second cache register integrated in the accumulator 32, or may be directly transmitted to the accumulator 32 for accumulation. In a case where these intermediate values are stored in the first cache register 1, as shown in FIG. 4, the multiplexer 2 may be controlled by the state machine 4 to transmit the intermediate values in the first cache register 1 to the accumulator 32 for an addition operation. In a case where these intermediate values are stored in the second cache register integrated in the accumulator 32, the state machine 4 may directly call the intermediate values in the second cache register for an addition operation, without using the multiplexer 2.

In practical applications, for example, according to the example shown in FIG. 4, the multiplier 31 and the accumulator 32 may perform calculation according to the following steps.

In step 1, the multiplexer 2, under the control of the state machine 4, selects $x_1$ from the first cache register 1, and outputs $x_1$ to both a multiplier port and a multiplicand port of the multiplier 31. Then, the multiplier 31 obtains a result of $x_1^2$ through calculation, and the multiplexer 2 transmits the result of $x_1^2$ (i.e., an intermediate value) to the first cache register 1 for storage, ready for calling.

In step 2, it is delayed for n (n being greater than or equal to 1 (n≥1)) clock(s) based on step 1, and then the multiplexer 2, under the control of the state machine 4, selects $a_1$ and $x_1$ from the first cache register 1, and outputs $a_1$ and $x_1$ to a multiplier port and a multiplicand port of the multiplier 31 respectively. Then, the multiplier 31 obtains a result of $a_1x_1$ through calculation. It will be noted that, the result of $a_1x_1$ here may also be stored in the first cache register 1 as an intermediate value.

In step 3, it is delayed for n (n≥1) clock(s) based on step 2, and then the multiplexer 2, under the control of the state machine 4, selects $a_4$ and the operation result of $x_1^2$ (i.e., the intermediate value) from the first cache register 1, and outputs $a_4$ and the operation result of $x_1^2$ to the multiplier port and the multiplicand port of the multiplier 31 respectively. Then, the multiplier 31 obtains a result of $a_4(x_1^2)$ through calculation. It will be noted that, the result of $a_4(x_1^2)$ here may also be stored in the first cache register 1 as an intermediate value.

In step 4, it is delayed for n (n≥1) clock(s) based on step 3, and then the multiplexer 2, under the control of the state machine 4, selects $x_1$ and $y_1$ from the first cache register 1, and outputs $x_1$ and $y_1$ to the multiplier port and the multiplicand port of the multiplier 31 respectively. Then, the multiplier 31 obtains a result of $x_1y_1$ through calculation, and the multiplexer 2 transmits the result of $x_1y_1$ (i.e., an intermediate value) to the first cache register 1 for storage, ready for calling.

In step 5, it is delayed for n (n≥1) clock(s) based on step 4, and then the multiplexer 2, under the control of the state machine 4, selects $y_1$ from the first cache register 1, and outputs $y_1$ to both the multiplier port and the multiplicand port of the multiplier 31. Then, the multiplier 31 obtains a result of $y_1^2$ through calculation, and the multiplexer 2 transmits the result of $y_1^2$ (i.e., an intermediate value) to the first cache register 1 for storage, ready for calling.

In step 6, it is delayed for n (n≥1) clock(s) based on step 5, and then the multiplexer 2, under the control of the state machine 4, selects $a_2$ and $y_1$ from the first cache register 1, and outputs $a_2$ and $y_1$ to the multiplier port and the multiplicand port of the multiplier 31 respectively. Then, the multiplier 31 obtains a result of $a_2y_1$ through calculation. It will be noted that, the result of $a_2y_1$ here may also be stored in the first cache register 1 as an intermediate value.

In step 7, it is delayed for n (n≥1) clock(s) based on step 6, and then the multiplexer 2, under the control of the state machine 4, selects $a_3$ and the result of $x_1y_1$ (i.e., the intermediate value) from the first cache register 1, and outputs $a_3$ and the result of $x_1y_1$ to the multiplier port and the multiplicand port of the multiplier 31 respectively. Then, the multiplier 31 obtains a result of $a_3(x_1y_1)$ through calculation. It will be noted that, the result of $a_3(x_1y_1)$ here may also be stored in the first cache register 1 as an intermediate value.

In step 8, it is delayed for n (n≥1) clock(s) based on step 7, and then the multiplexer 2, under the control of the state machine 4, selects $a_5$ and the result of $y_1^2$ (i.e., the intermediate value) from the first cache register 1, and outputs $a_5$ and the result of $y_1^2$ to the multiplier port and the multiplicand port of the multiplier 31 respectively. Then, the multiplier 31 obtains a result of $a_5(y_1^2)$ through calculation. It will be noted that, the result of $a_5(y_1^2)$ here may also be stored in the first cache register 1 as an intermediate value.

In step 9, it is delayed for n (n≥1) clock(s) based on step 8, and the multiplexer 2, under the control of the state machine 4, transmits $a_0$, $a_1x_1$, $a_2y_1$, $a_3(x_1y_1)$, $a_4(x_1^2)$ and $a_5(y_1^2)$ in the first cache register to the accumulator 32 for accumulation, so as to obtain and output $X_G$.

It can be understood that, at least one of the result of $a_1x_1$, the result of $a_2y_1$, the result of $a_3(x_1y_1)$, the result of $a_4(x_1^2)$ and the result of $a_5(y_1^2)$ may be stored in the first cache register 1 as an intermediate value, or may be stored in the second cache register integrated in the accumulator 32 as an intermediate value, or may be directly output by the multiplier 31 to the accumulator 32 for accumulation.

An operation method of $Y_G$ may be similar to the above steps. Moreover, in a case where the operation result of $x_1^2$, the operation result of $x_1y_1$ and the operation result of $y_1^2$ have been stored in the first cache register, the multiplier 31 may directly perform five operations, i.e., calculating $b_1x_1$, $b_2y_1$, $b_3(x_1y_1)$, $b_4(x_1^2)$ and $b_5(y_1^2)$. Thereafter, the accumulator 32 accumulates $b_0$, a result of $b_1x_1$, a result of $b_2y_1$, a result of $b_3(x_1y_1)$, a result of $b_4(x_1^2)$ and a result of $b_5(y_1^2)$, so as to obtain and output $Y_G$.

Likewise, at least one of the result of $b_1x_1$, the result of $b_2y_1$, the result of $b_3(x_1y_1)$, the result of $b_4(x_1^2)$ and the result of $b_5(y_1^2)$ may be stored in the first cache register 1 as an intermediate value, or may be stored in the second cache register integrated in the accumulator 32 as an intermediate value, or may be directly output by the multiplier 31 to the accumulator 32 for accumulation.

It is worth pointing out that, in a case where the result of $a_1x_1$, the result of $a_2y_1$, the result of $a_3(x_1y_1)$, the result of $a_4(x_1^2)$, and the result of $a_5(y_1^2)$, as well as the result of $b_1x_1$, the result of $b_2y_1$, the result of $b_3(x_1y_1)$, the result of $b_4(x_1^2)$, and the result of $b_5(y_1^2)$ are directly transmitted by the multiplier 31 to the accumulator 32 for accumulation, the multiplier 31 and the accumulator 32 not only achieve time division multiplexing separately, but also achieve a serial-parallel combination as a whole (i.e., in this case, the multiplier 31 and the accumulator 32 may work in parallel at a same time, and the multiplier 31 may also output the calculation results to the accumulator 32 to achieve serial working). As a result, operation capabilities of the multiplier 31 and the accumulator 32 may be fully utilized, and the operation speed may be improved.

Figure 6:
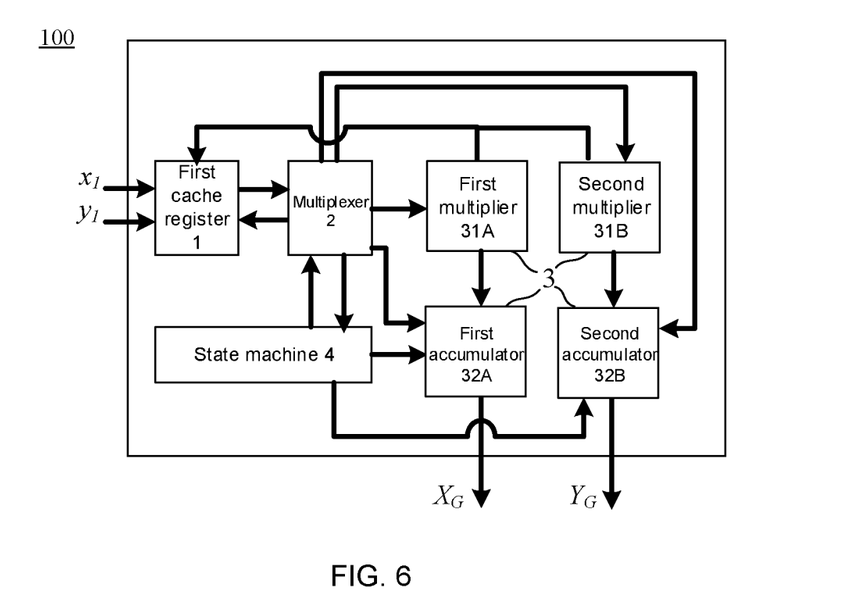
FIG. 6 is a block diagram showing a structure of yet another gaze point calculation apparatus, in accordance with some embodiments.

In another possible implementation, as shown in FIG. 6, the arithmetic unit assembly 3 may include a first multiplier 31A, a first accumulator 32A, a second multiplier 31B and a second accumulator 32B. The first multiplier 31A and the second multiplier 31B may be signed fixed-point multipliers, and the first accumulator 32A and the second accumulator 32B may be signed fixed-point accumulators. For operation processes and beneficial effects of the signed fixed-point multipliers and the signed fixed-point accumulators, details will not be repeated here.

The first multiplier 31A is coupled to the multiplexer 2, and the first accumulator 32A is coupled to the first multiplier 31A, the multiplexer 2 and the state machine 4. The first multiplier 31A is configured to calculate $x_1^2$, $a_1x_1$, $a_4(x_1^2)$, $a_2y_1$, $a_3(x_1y_1)$, and $a_5(y_1^2)$. The first accumulator 32A is configured to calculate $a_0+a_1x_1+a_2y_1+a_3xy_1+a_4x_1^2+a_5y_1^2$, so as to output $X_G$.

The second multiplier 31B is coupled to the multiplexer 2, and the second accumulator 32B is coupled to the second multiplier 31B, the multiplexer 2 and the state machine 4. The second multiplier 31B is configured to calculate $x_1^2$, $b_1x_1$, $b_4(x_1^2)$, $x_1y_1$, $y_9^2$, $b_2y_1$, $b_3(x_1y_1)$, and $b_5(y_1^2)$. The second accumulator 32B is configured to calculate $b_0+b_1x_1+b_2y_1+b_3x_1y_1+b_4x_1^2+b_5y_1^2$, so as to output $Y_G$.

In this possible implementation, $X_G$ may be obtained through calculation by using the first multiplier 31A and the first accumulator 32A, and at a same time, $Y_G$ may be obtained through calculation by using the second multiplier 31B and the second accumulator 32B. That is, in this way, synchronous processing of an abscissa and an ordinate may be realized, thereby facilitating to improve an overall operation speed of the arithmetic unit assembly 3.

The intermediate values stored in the first cache register 1 include at least an operation result of $x_1^2$, an operation result of $x_1y_1$, and an operation result of $y_1^2$. In this possible implementation, it will be noted that, it is not limited herein to the example in which $x_1^2$, $x_1y_1$ and $y_1^2$ are calculated twice by using the above two multipliers (i.e., the first multiplier 31A and the second multiplier 31B). That is, $x_1^2$, $x_1y_1$ and $y_1^2$ may be calculated by using only one multiplier (e.g., the first multiplier 31A or the second multiplier 31B); alternatively, a part of $x_1^2$, $x_1y_1$ and $y_1^2$ (e.g., $x_1^2$ and $x_1y_1$) may be calculated by using a multiplier (e.g., the first multiplier 31A), and a remaining part of $x_1^2$, $x_1y_1$ and $y_1^2$ (e.g., $y_1^2$) may be calculated by using the other multiplier (e.g., the second multiplier 31B). As a result, the operation result of $x_1^2$, the operation result of $x_1y_1$ and the operation result of $y_1^2$ may be obtained, and then are transmitted to and stored in the first cache register 1 for sharing. In this way, it is possible to facilitate to simplify an operation process and improve an operation efficiency.

Likewise, it can be understood that, for at least one of the first multiplier 31A, the second multiplier 31B, the first accumulator 32A or the second accumulator 32B, the second cache register may be integrated therein. For a function and beneficial effect of integrating the second cache register, reference may be made to the above description, and details will not be repeated herein.

Figure 7:
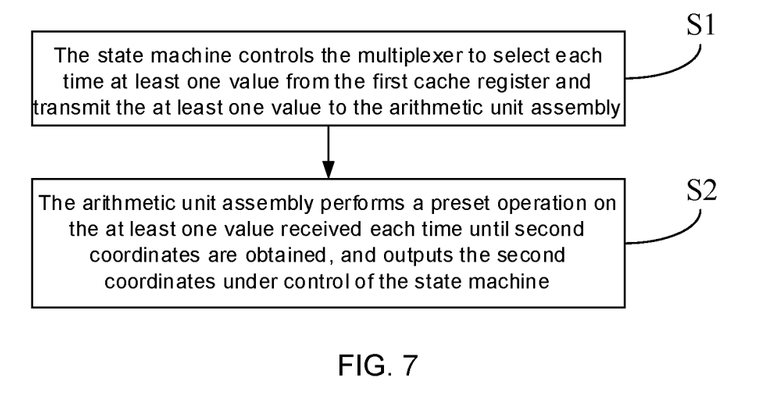
FIG. 7 is a flow diagram of a method for driving a gaze point calculation apparatus, in accordance with some embodiments.

Some embodiments of the present disclosure provide a driving method for a gaze point calculation apparatus. As shown in FIGS. 1A to 1C, the gaze point calculation apparatus 100 includes a first cache register 1, a multiplexer 2 coupled to the first cache register 1, an arithmetic unit assembly 3 coupled to the multiplexer 2, and a state machine 4 coupled to the first cache register 1, the multiplexer 2 and the arithmetic unit assembly 3. As shown in FIG. 7, the driving method includes the following steps.

In S1, the state machine 4 controls the multiplexer 2 to select each time at least one value from the first cache register 1 and transmit the at least one value to the arithmetic unit assembly 3. The at least one value is selected from first coordinates and a plurality of calibration parameters required when second coordinates are obtained through a calculation according to the first coordinates, and the first coordinates and the plurality of calibration parameters are stored in the first cache register. The first coordinates are position coordinates of a pupil.

In S2, the arithmetic unit assembly 3 performs a preset operation on the at least one value received each time until second coordinates are obtained, and outputs the second coordinates under control of the state machine 4. The second coordinates are position coordinates of a gaze point (e.g., the position coordinates of the gaze point in the display area B shown in FIG. 2).

Beneficial effects of the driving method are same as those of the above gaze point calculation apparatus, and details will not be repeated here.

Figure 8:
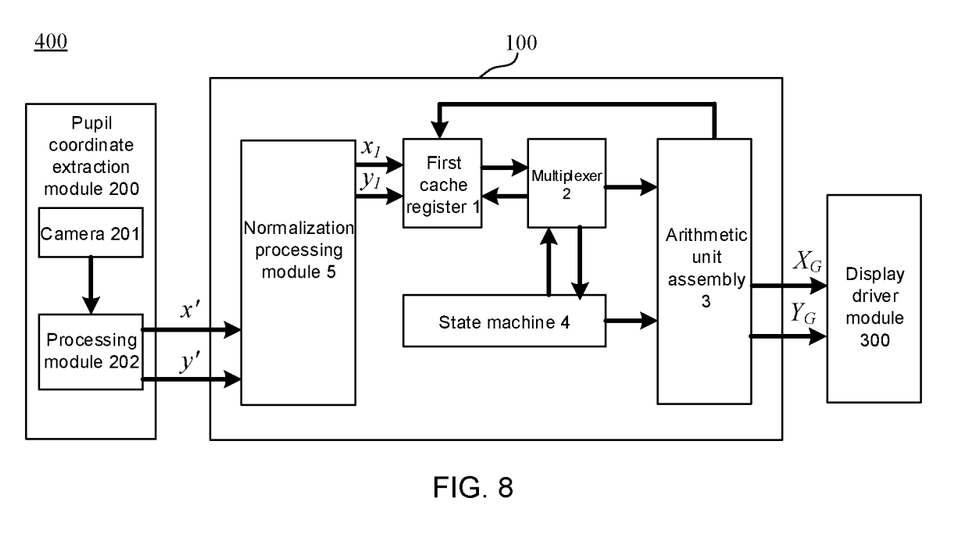
FIG. 8 is a block diagram showing a structure of an electronic device, in accordance with some embodiments.

Some embodiments of the present disclosure provide an electronic device 400. As shown in FIG. 8, the electronic device 400 includes a pupil coordinate extraction module 200, the gaze point calculation apparatus 100 as described in any of the above embodiments, and a display driver module 300 that are coupled in sequence.

The pupil coordinate extraction module 200 is configured to acquire an image of a human eye (e.g., the image A of the human eye shown in FIG. 2), and determine initial coordinates (x', y') of a pupil in the image of the human eye according to the image of the human eye. The initial coordinates (x', y') or initial coordinates after normalization processing are first coordinates ($x_1$, $y_1$), i.e., position coordinates of the pupil.

The gaze point calculation apparatus 100 is configured to obtain second coordinates ($X_G$, $Y_G$) through calculation according to the first coordinates ($x_1$, $y_1$). The second coordinates ($X_G$, $Y_G$) are position coordinates of a gaze point (e.g., the position coordinates of the gaze point in the display area B shown in FIG. 2).

The display driver module 300 is configured to process a displayed image according to the second coordinates. For example, display of local rendering of an image around the gaze point (i.e., the second coordinates) may be achieved. For example, the displayed image may be divided into a first display portion located around the gaze point (i.e., the second coordinates) and a second display portion other than the first display portion. During display, for example, a display effect may be improved by improving a rendering effect of the first display portion, or by controlling a display resolution of the first display portion to be greater than that of the second display portion, or by shrinking the displayed image to be an image only in the first display portion.

Based on this, for example, as shown in FIG. 8, the pupil coordinate extraction module 200 may include a camera 201 and a processing module 202.

The camera is configured to acquire the image of the human eye.

The processing module is configured to determine, according to the acquired image of the human eye, the initial coordinates of the pupil in the image of the human eye based on an image processing algorithm.

Figure 9:
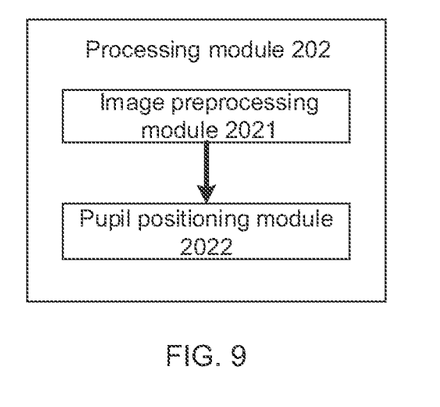
FIG. 9 is a block diagram showing a structure of a processing module, in accordance with some embodiments.

For example, referring to FIG. 9, the processing module 202 may include an image preprocessing module 2021 and a pupil positioning module 2022. The image preprocessing module 2021 may perform pre-processing (e.g., binarization processing) on the image of the human eye, and then the pupil positioning module 2022 may determine a position of the pupil based on a processed image of the human eye, i.e., the initial coordinates of the pupil in the image of the human eye.

It will be noted that, the electronic device 400 may be a display device, which may be, for example, any device with a display function, such as the AR display device or the VR display device.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the scope of the present disclosure shall be subject to the protection scope of the claims.

What is claimed is:

1. A gaze point calculation apparatus, comprising:
a first cache register configured to receive and store first coordinates and a plurality of calibration parameters required when second coordinates are obtained through calculation according to the first coordinates, the first coordinates being position coordinates of a pupil, and the second coordinates being position coordinates of a gaze point;
a multiplexer coupled to the first cache register;
an arithmetic unit assembly coupled to the multiplexer; and
a state machine coupled to the multiplexer and the arithmetic unit assembly, wherein
the state machine is configured to control the multiplexer to select each time at least one value from the first cache register and transmit the at least one value to the arithmetic unit assembly; the at least one value is selected from the first coordinates and the plurality of calibration parameters; and
the arithmetic unit assembly is configured to perform a preset operation on the at least one value received each time until the second coordinates are obtained, and output the second coordinates under control of the state machine;
wherein the gaze point calculation apparatus is integrated into an all-in-one device so as to realize gaze point recognition based on eye tracking.

2. The gaze point calculation apparatus according to claim 1, wherein the arithmetic unit assembly obtains the second coordinates through calculation according to following formulas:

$$X_G = a_0 + a_1 x_1 + a_2 y_1 + a_3 x_1 y_1 + a_4 x_1^2 + a_5 y_1^2;$$

$$Y_G = b_0 + b_1 x_1 + b_2 y_1 + b_3 x_1 y_1 + b_4 x_1^2 + b_5 y_1^2;$$

wherein $(x_1, y_1)$ is the first coordinates; $a_0$ to $a_5$ and $b_0$ to $b_5$ are the calibration parameters, and $a_0$ to $a_5$ and $b_0$ to $b_5$ are vectors; and $(X_G, Y_G)$ is the second coordinates.

3. The gaze point calculation apparatus according to claim 2, wherein the arithmetic unit assembly includes:
a multiplier coupled to the multiplexer, the multiplier being configured to calculate $x_1^2$, $a_1 x_1$, $a_4(x_1^2)$, $x_1 y_1$, $y_1^2$, $a_2 y_1$, $a_3(x_1 y_1)$, $a_5(y_1^2)$, $b_1 x_1$, $b_2 y_1$, $b_3(x_1 y_1)$, $b_4(x_1^2)$ and $b_5(y_1^2)$; and an accumulator coupled to the multiplier, the multiplexer and the state machine, the accumulator being configured to calculate $a_0 + a_p x_1 + a_2 y_1 + a_3 xy_1 + a_4 x_1^2 + a_5 y_1^2$ to output $X_G$, and calculate $b_0 + b_1 x_1 + b_2 y_1 + b_3 x_1 y_1 + b_4 x_1^2 + b_5 y_1^2$ to output $Y_G$.

4. The gaze point calculation apparatus according to claim 2, wherein the arithmetic unit assembly includes:
a first multiplier coupled to the multiplexer, the first multiplier being configured to calculate $a_1 x_1$, $a_4(x_1^2)$, $a_2 y_1$, $a_3(x_1 y_1)$, and $a_5(y_1^2)$;
a first accumulator coupled to the first multiplier, the multiplexer and the state machine, the first accumulator being configured to calculate $a_0 + a_1 x_1 + a_2 y_1 + a_3 xy_1 + a_4 x_1^2 + a_5 y_1^2$ to output $X_G$;
a second multiplier coupled to the multiplexer, the second multiplier being configured to calculate $b_1 x_1$, $b_4(x_1^2)$, $b_2 y_1$, $b_3(x_1 y_1)$, and $b_5(y_1^2)$; and
a second accumulator coupled to the second multiplier, the multiplexer and the state machine, the second accumulator being configured to calculate $b_0 + b_1 x_1 + b_2 y_1 + b_3 x_1 y_1 + b_4 x_1^2 + b_5 y_1^2$ to output $Y_G$, wherein
at least one of the first multiplier and the second multiplier is further configured to calculate $x_1^2$, $x_1 y_1$ and $y_1^2$; or, the first multiplier is further configured to calculate a part of $x_1^2$, $x_1 y_1$ and $y_1^2$, and the second multiplier is further configured to calculate a remaining part of $x_1^2$, $x_1 y_1$ and $y_1^2$.

5. The gaze point calculation apparatus according to claim 1, wherein the arithmetic unit assembly is further configured to:
convert the received at least one value from an original code into a complement code;
calculate the at least one value converted into the complement code to obtain an intermediate calculation result; and
convert the intermediate calculation result from another complement code into another original code to obtain an operation result.

6. The gaze point calculation apparatus according to claim 1, wherein the arithmetic unit assembly is further coupled to the first cache register; the arithmetic unit assembly is further configured to transmit, under the control of the state machine, at least a part of intermediate values that need to be stored in intermediate values generated by the arithmetic unit assembly to the first cache register for storage.

7. The gaze point calculation apparatus according to claim 1, further comprising:
a normalization processing module coupled to the first cache register, the normalization processing module being configured to:
receive initial coordinates of the pupil in an acquired image of a human eye; and
perform normalization processing on the initial coordinates to obtain the first coordinates, and transmit the first coordinates after the normalization processing to the first cache register.

8. The gaze point calculation apparatus according to claim 7, wherein the normalization processing module performs the normalization processing on the initial coordinates according to following formulas:

$$x_1 = x'/\text{a lateral resolution of the acquired image of the human eye};$$

$$y_1 = y'/\text{a vertical resolution of the acquired image of the human eye};$$

wherein $(x', y')$ is the initial coordinates, and $(x_1, y_1)$ is the first coordinates.

9. The gaze point calculation apparatus according to claim 1, wherein
the gaze point calculation apparatus is a field programmable gate array (FPGA) chip or an application specific integrated circuit (ASIC) chip.

10. An electronic device, comprising the gaze point calculation apparatus according to claim 1.

11. The electronic device according to claim 10, wherein the electronic device comprises an augmented reality (AR) display device or a virtual reality (VR) display device.

12. The electronic device according to claim 10, further comprising a pupil coordinate extraction module and a display driver module that are coupled to the gaze point calculation apparatus, wherein
the pupil coordinate extraction module is configured to acquire an image of a human eye, and determine initial coordinates of the pupil in the image of the human eye according to the image of the human eye; the initial coordinates or initial coordinates after normalization processing are the first coordinates, and the first coordinates are the position coordinates of the pupil;
the gaze point calculation apparatus is configured to obtain the second coordinates through calculation according to the first coordinates; the second coordinates are the position coordinates of the gaze point; and
the display driver module is configured to process a displayed image according to the second coordinates.

13. The electronic device according to claim 12, wherein the pupil coordinate extraction module includes:
a camera configured to acquire the image of the human eye; and
a processing module configured to determine, according to the acquired image of the human eye, the initial coordinates of the pupil in the image of the human eye based on an image processing algorithm.

14. The gaze point calculation apparatus according to claim 1, wherein the arithmetic unit assembly further includes at least one second cache register; the arithmetic unit assembly is further configured to transmit, under the control of the state machine, at least a part of intermediate values that need to be stored in intermediate values generated by the arithmetic unit assembly to the at least one second cache register for storage.

15. The gaze point calculation apparatus according to claim 1, wherein the arithmetic unit assembly is further coupled to the first cache register; the arithmetic unit assembly is further configured to transmit, under the control of the state machine, some of at least a part of intermediate values that need to be stored in intermediate values generated by the arithmetic unit assembly to the first cache register for storage; and the arithmetic unit assembly further includes at least one second cache register; the arithmetic unit assembly is further configured to transmit, under the control of the state machine, another of the part of intermediate values that need to be stored in the intermediate values generated by the arithmetic unit assembly to the at least one second cache register for storage.

16. A driving method for a gaze point calculation apparatus, the gaze point calculation apparatus including a first cache register, a multiplexer coupled to the first cache register, an arithmetic unit assembly coupled to the multiplexer, and a state machine coupled to the multiplexer and the arithmetic unit assembly, the driving method comprising:

controlling, by the state machine, the multiplexer to select each time at least one value from the first cache register and transmit the at least one value to the arithmetic unit assembly; the at least one value is selected from first coordinates and a plurality of calibration parameters required when second coordinates are obtained through calculation according to the first coordinates, both the first coordinates and the plurality of calibration parameters are stored in the first cache register;

performing, by the arithmetic unit assembly, a preset operation on the at least one value received each time until the second coordinates are obtained; and outputting, by the arithmetic unit assembly, the second coordinates under control of the state machine;

wherein the gaze point calculation apparatus is integrated into an all-in-one device so as to realize gaze point recognition based on eye tracking.

17. The driving method according to claim 16, wherein the second coordinates are obtained according to following formulas:

$X_G = a_0 + a_1 x_1 + a_2 y_1 + a_3 x_1 y_1 + a_4 x_1^2 + a_5 y_1^2;$ $Y_G = b_0 + b_1 x_1 + b_2 y_1 + b_3 x_1 y_1 + b_4 x_1^2 + b_5 y_1^2;$ wherein $(x_1, y_1)$ is the first coordinates; $a_0$ to $a_5$ and $b_0$ to $b_5$ are the calibration parameters, and $a_0$ to $a_5$ and $b_0$ to $b_5$ are vectors; and $(X_G, Y_G)$ is the second coordinates.

18. The driving method according to claim 13, further comprising:

converting the received at least one value from an original code into a complement code;

calculating the at least one value converted into the complement code to obtain an intermediate calculation result; and converting the intermediate calculation result from another complement code into another original code to obtain an operation result.

19. The driving method according to claim 16, further comprising:

receiving initial coordinates of the pupil in an acquired image of a human eye;

performing normalization processing on the initial coordinates to obtain the first coordinates, and transmitting the first coordinates after the normalization processing to the first cache register.

20. The driving method according to claim 19, wherein the normalization processing is performed according to following formulas:

$x_1 = x'/\text{lateral resolution of the acquired image of the human eye};$ $y_1 = y'/\text{vertical resolution of the acquired image of the human eye};$ wherein $(x', y')$ is the initial coordinates, and $(x_1, y_1)$ is the first coordinates.

* * * * *